P. FEDOROW.
AUTOMOBILE FENDER.
APPLICATION FILED MAY 7, 1920.

1,347,624.

Patented July 27, 1920.
2 SHEETS—SHEET 1.

INVENTOR
Peter Fedorow
BY
George C. Heinrich
ATTORNEY

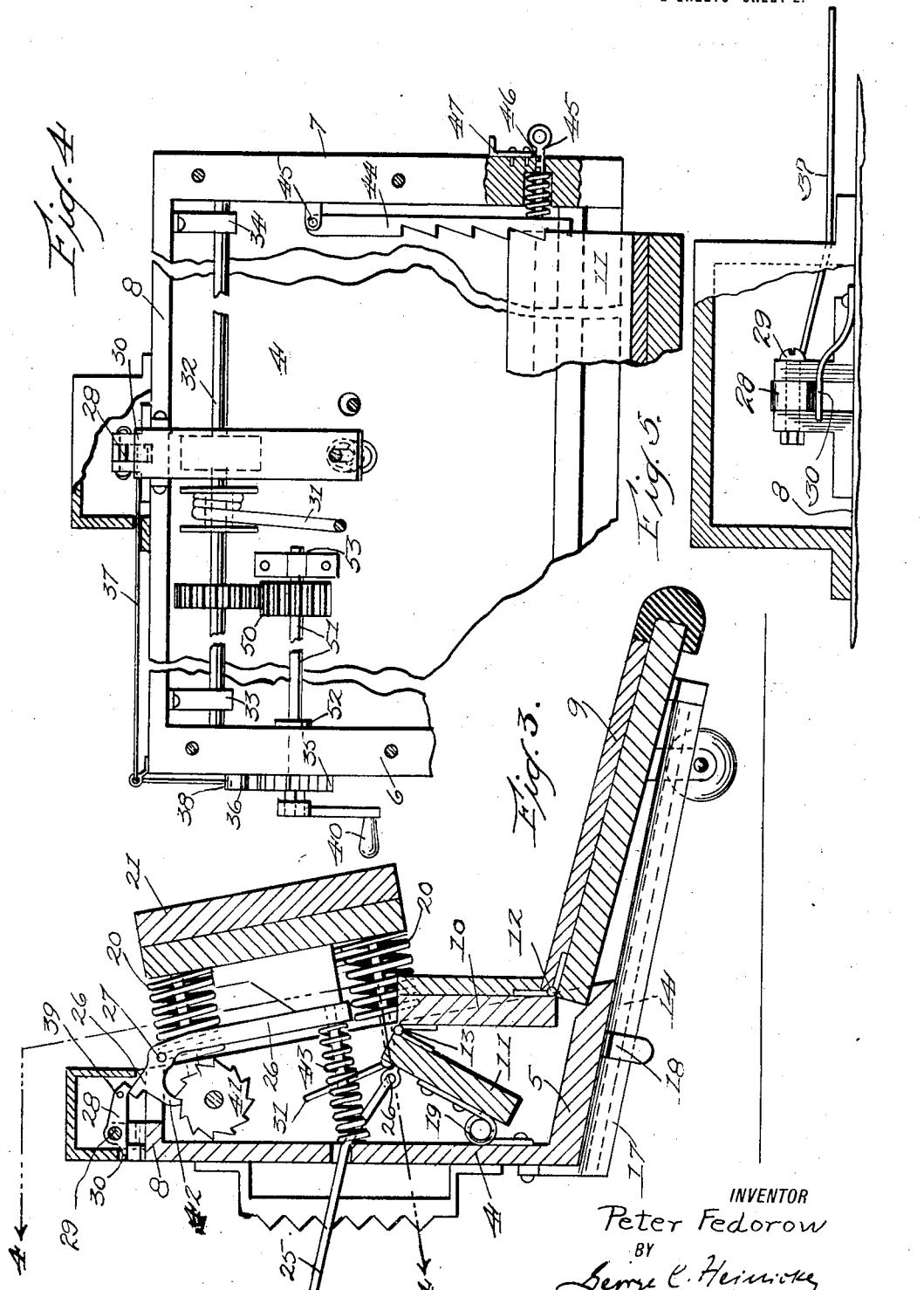

UNITED STATES PATENT OFFICE.

PETER FEDOROW, OF CHICAGO, ILLINOIS.

AUTOMOBILE-FENDER.

1,347,624.        Specification of Letters Patent.        Patented July 27, 1920.

Application filed May 7, 1920. Serial No. 379,471.

*To all whom it may concern:*

Be it known that I, PETER FEDOROW, a citizen of Poland, residing at Chicago, county of Cook, and State of Illinois, have invented certain new and useful Improvements in Automobile-Fenders, of which the following is a specification.

This invention relates to fenders suitable for mounting on automobiles, trolley cars and the like, the object thereof being to act as a means to prevent a person or object in the path of the vehicle, when moving, from being run over or injured.

Another object of this invention is to provide a fender of the above mentioned type adapted upon coming in contact with a person or object to automatically assume a different position to aid in the accomplishment of the above object.

Another object of the invention is to provide a combination fender and bumper for automobiles and the like, and to provide relatively movable parts adapted to be actuated by a person on the automobile, and whereby a person run into will be safeguarded from being run over or injured by the vehicle.

A further object of the invention is to provide a fender and bumper for automobiles and the like, and one which may be installed on the vehicle without requiring severe structural changes thereto, and a device which is inexpensive to manufacture, easy to install, and one which is sure and effective in operation.

Other objects will in part be obvious and in part pointed out hereinafter.

Referring to the drawings, Figure 1 represents a side view of the fender and bumper mounted on the chassis of an automobile;

Fig. 3 is a sectional view on the line 3—3 of Fig. 2;

Fig. 4 is a sectional view on the line 4—4 of Fig. 3;

Fig. 5 is a detail view illustrating the function of spring 30.

Similar reference characters refer to similar parts throughout the several views, and in which—

Figure 1:
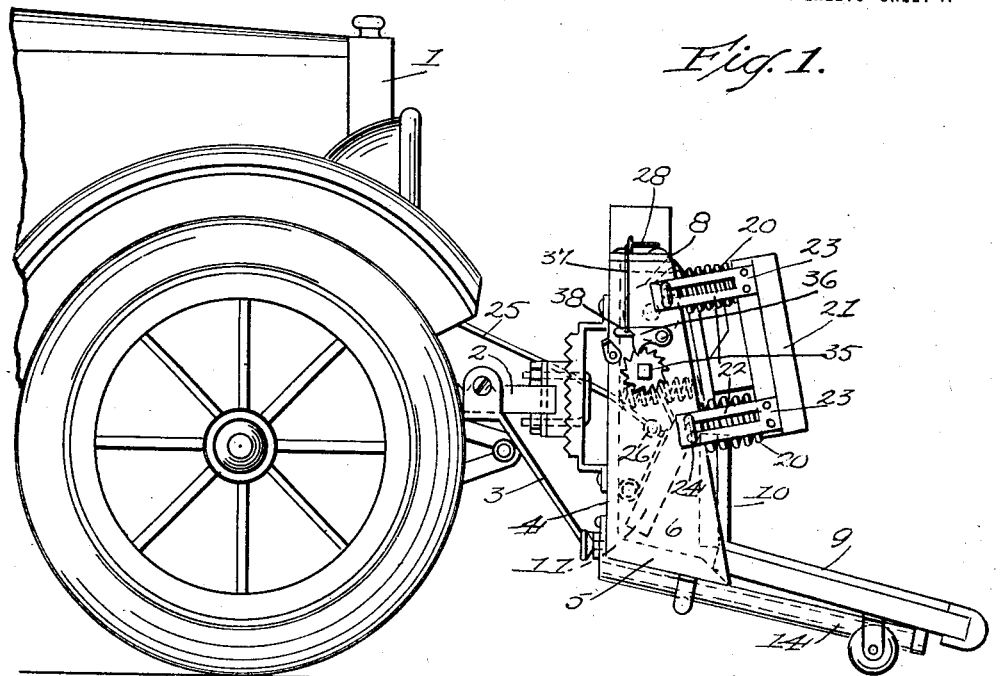
Figure 2:
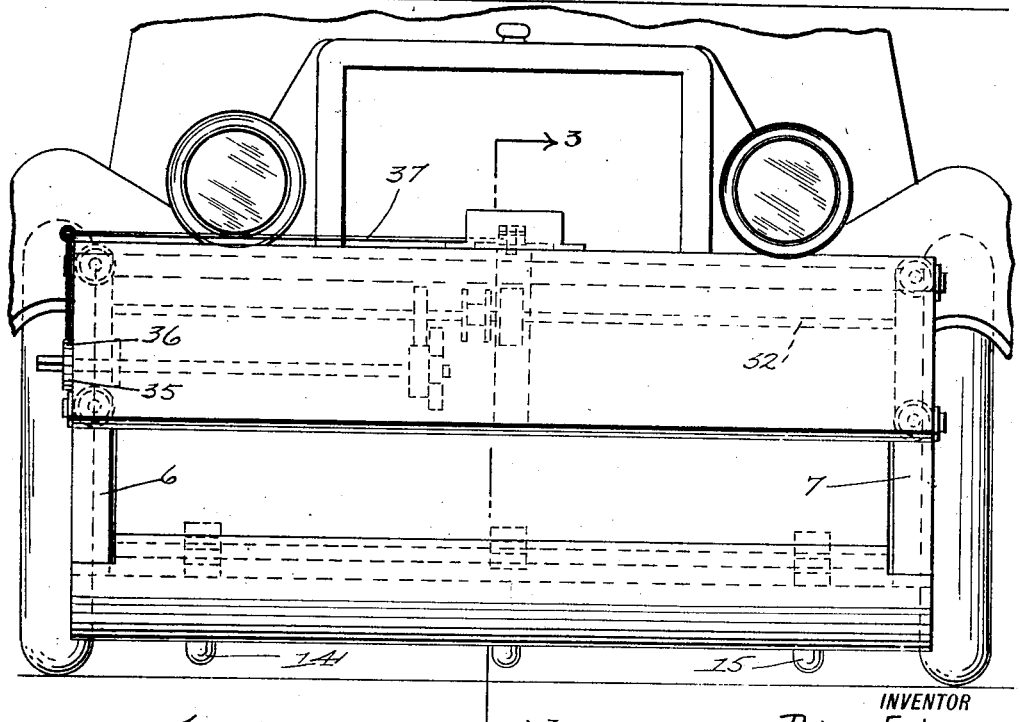
Fig. 2 is a front view of the fender and bumper.

1 represents the front end of an automobile on which is mounted by some suitable means, a support comprising a pair of horizontally-extending bars 2, on opposite sides of the chassis, each bar carrying a depending brace-bar 3. Members 2 and 3 support a frame in front of the automobile, said frame comprising a rear plate 4, a lower plate 5, side plates 6 and 7, and top plate 8, the frame being composed of wood or metal, or other suitable substance, and the parts thereof either made in one piece or in several pieces fastened together.

A collapsible platform comprising three parts, 9, 10 and 11, respectively, hinged together as at 12 and 13, is carried on the fender frame by means of rods 14 and 15, fastened to the underneath side of member 9, and having their outer ends slidably mounted in tubes 16 supported on the fender frame as at 18. Member 11 of the folding platform is fastened to member 4 of the fender frame by means of a spring 19, adapted to continually urge the folding platform to assume extended position, that is, to place members 9, 10 and 11 of the platform on substantially the same plane, and projecting out from the frame, thus offering increased protection to a person or object struck by the fender, and adapted to receive and carry such person thereon.

Each side member of the fender support carries a pair of coil springs 20, on which is yieldingly supported a bumper member 21, by means of slotted bars 22, attached to the bumper as at 23, and slidably held on the side supports of the fender, as by studs 24, piercing the slots of members 22 so that bumper member may be moved inwardly of the support as by the bumper encountering a person or object in its path, thus lessening the chance of resultant injury.

A rope 25 attached to member 11 of the platform as at 26 and leading to the driver's seat or some other suitable part of the automobile, may be supplied so that the platform may be placed in collapsed or extended position by a person on the automobile at will.

However, automatic means may be supplied whereby movement of bumper 21, as when it encounters a person or object, causes the fender platform to assume extended position and thereby afford greater protection, and such means may comprise a lever 26, pivoted to the frame as at 27, and having an arm in the path of movement of bumper 21, and another arm upholding another lever 28, pivoted to the frame as at 29, and continually urged to move downwardly by a spring 30 mounted on the frame and bearing against lever 28, so that inward movement of bumper 21 will move lever 26 out from under lever 28 and allow lever 28 to be moved downward by reason of the action of spring 30 thereon. The fender platform may be normally held in folded position against action of spring 19 by means of a flexible rope or wire 31, attached to member 11 of the platform and adapted to be wound upon a revoluble shaft 32, horizontally mounted in bearings 33 and 34 on the frame and geared as at 50 to another horizontally disposed shaft 51, mounted in bearings 52 and 53 on the frame, said shaft 51 carrying a ratchet 35, adapted to be engaged by a pawl 36, mounted on the frame to hold shaft 32 against unwinding movement and the platform in collapsed position. A string or wire 37 may so connect pawl 36 to lever 28 as at 38 and 39, respectively, that upon movement of lever 28 by spring 30, pawl 36 will be tripped and the platform will assume extended position. A crank 40 may be supplied adapted to fit onto shaft 32 and whereby this shaft may be turned to place the platform into collapsed position.

Instead of ratchet 35, a ratchet 41, may be supplied to shaft, 32, adapted to be engaged by a projection 42 on lever 26 to prevent unwinding movement of that shaft, a spring 43 engaging said lever adapted to hold the projection in engagement with the ratchet, but said engagement being adapted to be broken upon inward movement of bumper member 21 and thereby cause the platform to assume extended position, as above described.

A vertically disposed rack 44, pivoted to the frame as at 45, and adapted to engage member 11 of the platform when in extended or in partially extended position may be supplied to prevent the collapsing of the platform if and when it encounters the ground or an obstacle in its path. Rack 44 may carry a stud 45 having a recess 46 adapted to be engaged by a latch 47 mounted on the frame whereby said rack may be held in inoperative position.

The above described embodiments of the invention may be used singly or in combination, or other modfications may be employed without departing from the scope of the invention.

Having thus described my invention what I claim as new and desire to secure by Letters Patent of the United States is as follows—

1. In a device of the character described, in combination, a support adapted to be mounted on the chassis of an automobile, a collapsible platform mounted on said support, means comprising a spring mounted on said support continually urging said platform to assume extended position, means whereby said platform may be held in collapsed position against the action of said spring, a plurality of other springs mounted on said support, a bumper-member yieldably mounted on said support and engaging said last-mentioned springs, said platform and bumper-member being adapted to coöperate to yieldingly receive and carry a person or other movable object encountered by said device.

2. In a device of the character described, in combination, a support adapted to be mounted on the chassis of an automobile, a frame mounted on said support, a collapsible platform mounted on said frame, means comprising a spring mounted on said frame continually urging said platform to assume extended position, means comprising a ratchet and pawl mounted on said frame whereby said platform may be held in collapsed position against the action of said spring, a plurality of other springs mounted on said frame, a bumper-member movably mounted on said frame adjacent said last mentioned springs and adapted upon predetermined movement to trip said pawl to cause said platform to assume extended position, a rotatable shaft mounted on said frame, a rope fastened to said platform and adapted upon the turning of said shaft to be wound thereon and thereby cause said platform to assume collapsed position, means comprising a rack mounted in said frame and adapted to engage said platform and hold said platform in extended position, said rack being movable to permit movement of said platform into collapsed position, and means mounted on said frame and adapted to engage said rack whereby said rack may be held in inoperative position.

In testimony whereof I have affixed my signature.

PETER FEDOROW.